(12) United States Patent
Tokuyama et al.

(10) Patent No.: US 7,981,585 B2
(45) Date of Patent: Jul. 19, 2011

(54) CLEANING BLADE

(75) Inventors: Mitsuru Tokuyama, Kizugawa (JP); Kouichi Takenouchi, Tenri (JP); Hiroo Naoi, Nara (JP); Kiyofumi Morimoto, Tenri (JP); Kazuma Hinoue, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 851 days.

(21) Appl. No.: 11/930,561

(22) Filed: Oct. 31, 2007

(65) Prior Publication Data

US 2008/0103257 A1     May 1, 2008

(30) Foreign Application Priority Data

Nov. 1, 2006  (JP) .............................. P2006-298204

(51) Int. Cl.
*G03G 21/00* (2006.01)
(52) U.S. Cl. .................... 430/119.84; 399/346; 399/350
(58) Field of Classification Search .................. 399/101, 399/346, 350; 430/49.82, 49.84, 119.82, 430/119.84; 525/165, 185, 199, 265
See application file for complete search history.

(56) References Cited

U.S. PATENT DOCUMENTS

| | | | | |
|---|---|---|---|---|
| 3,936,183 | A | * | 2/1976 | Sadamatsu ..................... 399/350 |
| 3,973,845 | A | * | 8/1976 | Lindblad et al. ............... 399/350 |
| 4,162,216 | A | * | 7/1979 | Nyer .............................. 210/794 |
| 4,984,326 | A | * | 1/1991 | Horie et al. ................... 15/256.5 |
| 5,138,395 | A | | 8/1992 | Lindblad et al. |
| 5,162,858 | A | * | 11/1992 | Shoji et al. ..................... 399/350 |
| 5,204,034 | A | * | 4/1993 | Sasame et al. ................. 264/138 |
| 5,260,756 | A | * | 11/1993 | Yanai et al. .................... 399/350 |
| 5,733,702 | A | * | 3/1998 | Okado et al. ............. 430/119.86 |
| 5,819,147 | A | * | 10/1998 | Shoji .............................. 399/284 |
| 6,987,943 | B2 | * | 1/2006 | Ito ................................. 399/350 |
| 2002/0031384 | A1 | * | 3/2002 | Sato .............................. 399/346 |
| 2003/0229961 | A1 | * | 12/2003 | Barnett ...................... 15/250.48 |
| 2004/0224245 | A1 | * | 11/2004 | Shigezaki et al. .............. 430/66 |
| 2004/0234294 | A1 | * | 11/2004 | Nagame et al. ............... 399/159 |
| 2005/0118518 | A1 | * | 6/2005 | Ikegami et al. ............ 430/58.75 |
| 2005/0130050 | A1 | * | 6/2005 | Takada et al. ................... 430/45 |
| 2006/0087530 | A1 | * | 4/2006 | Furukawa ........................ 347/33 |
| 2007/0019989 | A1 | * | 1/2007 | Nakamori ..................... 399/159 |

(Continued)

FOREIGN PATENT DOCUMENTS

JP      61048882 A   *   3/1986

(Continued)

OTHER PUBLICATIONS

English translation of Kamitaki et al. (JP pub 2003-195711).*

(Continued)

*Primary Examiner* — David M Gray
*Assistant Examiner* — Geoffrey T Evans
(74) *Attorney, Agent, or Firm* — Nixon & Vanderhye P.C.

(57) ABSTRACT

In an image forming apparatus comprising a charging section, an exposure section, a developing section, a transfer section, a peeling section, a cleaning section including a cleaning blade, and a fixing section, the cleaning blade is composed by dispersing 15 parts by weight through 33 parts by weight of fluorine resin particulate and secondary particles thereof into 100 parts by weight of a synthetic resin of a base material and, on a surface of the cleaning blade 16a, and a number of the secondary particles of the fluorine resin particulate having a particle diameter of 0.5 μm or more existing in unit area of 100 μm$^2$ is made to be 50 or less.

10 Claims, 1 Drawing Sheet

U.S. PATENT DOCUMENTS

2007/0217820 A1 * 9/2007 Shigemori et al. ............ 399/134

FOREIGN PATENT DOCUMENTS

| JP | 1-279282 A | 11/1989 |
| --- | --- | --- |
| JP | 3-107984 A | 5/1991 |
| JP | 4-294380 A | 10/1992 |
| JP | 08220962 A * | 8/1996 |
| JP | 2000-35734 | 2/2000 |
| JP | 2003-195711 | 7/2003 |
| JP | 2006-91566 | 4/2006 |
| JP | 2006-145958 A | 6/2006 |
| JP | 2006-293169 A | 10/2006 |

OTHER PUBLICATIONS

English translation of Katsuno (JP 61-048882).*

* cited by examiner

CLEANING BLADE

CROSS-REFERENCE TO RELATED APPLICATION

This application claims priority to Japanese Patent Application No. 2006-298204, which was filed on Nov. 1, 2006, the contents of which are incorporated herein by reference in its entirety.

BACKGROUND OF THE INVENTION

1. Field of the Invention

The present invention relates to a cleaning blade and an image forming apparatus.

2. Description of the Related Art

An image forming apparatus employing an electrophotographic system (occasionally simply referred to as the "image forming apparatus" hereinafter) is used for various purposes in many industrial fields, because the image forming apparatus is capable of forming a high-quality image with a simple operation and a maintenance checkup thereof is simple. The image forming apparatus comprises, for example, a photoreceptor drum, a charging section, an exposure section, a developing section, a transfer section, a fixing section, and a cleaning section. The photoreceptor drum has a photosensitive layer on the surface thereof. The charging section charges the surface of the photoreceptor drum. The exposure section irradiates the surface of the photoreceptor drum having been charged with a signal light, thereby forming an electrostatic latent image. The developing section supplies toner to the electrostatic latent image to form a toner image. The transfer section transfers the toner image to a recording medium. The fixing section fixes the toner image to the recording medium by heating and pressurizing. The cleaning section includes a cleaning blade that is disposed so as to abut on the surface of the photoreceptor drum, and removes extra toner, paper dust and so on adhering to the surface of the photoreceptor drum.

Although the image forming apparatus is capable of forming a high-quality image as described above, the image forming apparatus is expected to have a higher performance in accordance with the wide spread thereof. For example, reduction of consumed electric power is required. For the reduction of consumed electric power, it is chiefly considered to decrease a heating temperature (occasionally referred to as the "fixing temperature" hereinafter) at the time of fixing of the toner image to the recording medium. As one part thereof, toner is provided with low-temperature fixability by increase of the content of a release agent (wax) in the toner. However, the release agent has a weak point of not remaining in toner particles but seeping out to the surface of the toner. Therefore, in a case where the toner remains on the surface of the photoreceptor drum after the toner image is transferred to the recording medium, the release agent seeps out from the inside of the remaining toner and adheres to the surface of the photoreceptor drum. Then, the release agent is spread by the cleaning blade in a relatively wide range in the circumferential direction of the photoreceptor drum, whereby such a phenomenon called filming tends to occur very easily that the release agent adheres like a film to the surface of the photoreceptor drum. The filming hinders uniform charge of the surface of the photoreceptor drum, resulting in occurrence of an image failure such as an image blur that impairs clearness of the image. Moreover, the toner may adhere or fuse onto the cleaning blade, thereby causing an image failure such as a white line. Accordingly, a technique of decreasing the fixing temperature by using toner with low-temperature fixability has problems to be solved, such as prevention of occurrence of the filming and prevention of adhesion or fusion of the toner.

For these problems, a technique of preventing the release agent from being spread, by decreasing the surface energy of the photoreceptor drum and/or the cleaning blade has been proposed in various patterns. For example, a technique of applying a lubricating agent to the surface of the photoreceptor drum is proposed. In this technique, a mechanism for applying the lubricating agent to the surface of the photoreceptor drum needs to be disposed inside the image forming apparatus, because the lubricating agent is a consumable item. Addition of such a mechanism makes the image forming apparatus large in size and makes the internal structure of the image forming apparatus complicated, lowers simplicity of the maintenance checkup, the service life, convenience, and so on, of the image forming apparatus, and raises the cost of manufacture thereof. Further, a technique of making the photosensitive layer on the surface of the photoreceptor drum contain fluorine resin particulate is proposed. In a case where the photosensitive layer is made to contain the fluorine resin particulate, there is the fear that the sensitivity to the signal light irradiated by the exposure section deteriorates and image reproducibility is impaired. Moreover, there is the fear that pinholes due to the fluorine resin particulate are generated in the photosensitive layer, uniform chargeability of the photosensitive layer is impaired, and an image failure is caused. Further, a technique of providing a fluorine resin layer on the surface of the cleaning blade is proposed. Since this fluorine resin layer gradually abrades away as being rubbed against the photoreceptor drum, the fluorine resin layer will not exert a sufficient effect all through the service life of the photoreceptor drum.

Furthermore, in Japanese Unexamined Patent Publication JP-A 2003-195711, such a cleaning blade is proposed that is composed of a material obtained by dispersing 0.1 part by mass through 50 parts by mass of resin particulate made of vinyl resin, fluorine resin or polyester and having a number average particle diameter of 0.01 μm through 30 μm, into 100 parts by mass of polyurethane rubber. In JP-A 2003-195711, there is a specific description on the effect of the fluorine resin particulate, only for fluorine resin particulate that is a copolymer of ethyl fluoride methacrylate, methyl methacrylate and styrene produced in example 5 of production of the resin particulate described in paragraph [0104]. Moreover, JP-A 2003-195711 describes that 0.1 part by mass through 50 parts by mass of the resin particulate is added to 100 parts by mass of polyurethane rubber of the base material, but the addition amount of the fluorine resin particulate specifically disclosed in table 1 of paragraph [0124] is merely 5 parts by mass. Since the fluorine resin particulate described above does not have sufficient wettability on polyurethane rubber of the base material, uniform dispersiveness in the base material is impaired when 15 parts by mass or more of the fluorine resin particulate is added to 100 parts by mass of the base material. As a result, the mechanical strength, and further, service life of the entire cleaning blade may decrease. In paragraph [0042], polytetrafluoroethylene is also described as the fluorine resin. However, even if the polytetrafluoroethylene particulate is used by 5 parts by mass, which is the addition amount of the fluorine resin particulate specifically disclosed in paragraph [0124], occurrence of a cleaning failure at a relatively small number of printed sheets cannot be avoided. Moreover, JP-A 2003-195711 does not disclose anything about use of the cleaning blade disclosed therein in the image forming apparatus using the toner in which the content of the release agent is increased in order to enhance low-temperature fixability.

Furthermore, in Japanese Unexamined Patent Publication JP-A 2006-91566, a cleaning blade including a base and a skin layer is proposed. In the technique of JP-A 2006-91566, the base is a hardened body of polyurethane composition, which has an average particle diameter of 0.1 mm through 0.5 mm and which contains low-hardness particulate having lower hardness than the skin layer. The skin layer is a layer that is disposed to at least the surface of the base at a portion rubbed against the surface of the photoreceptor drum and that does not contain the low-hardness particulate. Moreover, claim 2 of JP-A 2006-91566 describes that the low-hardness particulate is composed of one kind or two kinds or more selected from among urethane elastomer, polyester elastomer, fluorine rubber, silicone rubber, and cellulosic polymer. The low-hardness particulate composed of fluorine rubber specifically used in an example is an ethylene tetrafluoroethylene copolymer having an average particle diameter of 0.5 mm (product name: Fluon CD086 produced by Asahi Glass Co., Ltd.). However, in a case where the skin layer is provided at the rubbed portion of the surface of the base, the skin layer gradually abrades away by being rubbed against the surface of the photoreceptor drum, and an effect of the skin layer of reducing the surface energy lowers. Therefore, even if such a skin layer is provided, it is impossible to sufficiently keep the effect all through the service life of the photoreceptor drum.

SUMMARY OF THE INVENTION

An object of the invention is to provide a cleaning blade that, even if using low-temperature-fixing toner containing a relatively large amount of a release agent, does not cause filming, adhesion or fusion of the toner, or the like, and has an excellent cleaning capability, and provide an image forming apparatus comprising the cleaning blade.

The invention provides a cleaning blade comprising a synthetic resin as a base material; fluorine resin particulate; and secondary particles thereof, the fluorine resin particulate and the secondary particles being dispersed into the synthetic resin, wherein a content of the fluorine resin particulate and the secondary particles is in a range of from 15 parts by weight to 33 parts by weight with respect to 100 parts by weight of the synthetic resin; and the secondary particles of the fluorine resin particulate having a particle diameter of 0.5 µm or more are contained at a ratio of 50 or less per 100 µm$^2$.

According to the invention, a cleaning blade comprises a synthetic resin as a base material; fluorine resin particulate; and secondary particles thereof, the fluorine resin particulate and the secondary particles being dispersed into the synthetic resin. In the cleaning blade of the invention, the content of the fluorine resin particulate and the secondary particles thereof is in a range of from 15 parts by weight to 33 parts by weight with respect to 100 parts by weight of the synthetic resin of the base material. Moreover, in observation of the short-side cross section of the cleaning blade, the number of the secondary particles of the fluorine resin particulate having a particle diameter of 0.5 µm or more observed per unit area (100 µm$^2$) is 50 or less. The cleaning blade having these characteristics has considerably low surface energy. Therefore, for example, in a case where the low-temperature-fixable toner that contains the release agent by 5% or more of the whole weight of the toner is used, occurrence of filming, adhesion or fusion of the toner or the like is inhibited, and the surface of the photoreceptor drum can be cleaned in an extremely favorable manner. Incidentally, in toner produced by a usual melting, kneading and grinding method, the content of the release agent is in a range of from 1% by weight to 2% by weight of the whole weight of the toner.

Accordingly, the cleaning blade of the invention can keep a favorable cleaning capability all through the service life of the photoreceptor drum, and contribute to stable formation of a high-quality printed image free from an image failure such as an image blur and a white line. Moreover, by dispersing the fluorine resin particulate and the secondary particles thereof into the base material in the aforementioned dispersion state, the mechanical strength of the cleaning blade itself is increased, and the service life thereof is extended. Moreover, when compared with the case of forming, only on the surface of the cleaning blade, a coating layer composed of synthetic resin obtained by dispersing the fluorine resin particulate and the secondary particles thereof, it is possible to not only prevent decrease of the effect of the coating layer due to abrasion, but also reduce the amount of film thickness decrease of the photosensitive film on the surface of the photoreceptor drum. Consequently, it is possible to extend the service life of the photoreceptor drum.

Further, in the invention, it is preferable that the content of the fluorine resin particulate and the secondary particles thereof is in a range of from 18 parts by weight to 30 parts by weight with respect to 100 parts by weight of the synthetic resin of the base material.

According to the invention, the content of the fluorine resin particulate and the secondary particles thereof is in a range of from 18 parts by weight to 30 parts by weight with respect to 100 parts by weight of the synthetic resin of the base material, so that the cleaning capability of the cleaning blade of the invention is further enhanced. At the same time, load on the surface of the photoreceptor drum by the cleaning blade of the invention is reduced, and film thickness decrease of the photosensitive film on the surface of the photoreceptor drum is avoided, so that the photosensitive film will not be damaged.

Furthermore, in the invention, it is preferable that a volume average particle diameter of the fluorine resin particulate is in a range of from 50 nm to 200 nm.

According to the invention, by using, as the fluorine resin particulate, fluorine resin particulate having a volume average particle diameter of 50 nm through 200 nm, dispersiveness of the fluorine resin particulate in the base material is improved. Consequently, the number of the secondary particles of the fluorine resin particulate in unit area is decreased, and the cleaning capability is further enhanced. Moreover, the durability of the cleaning blade itself is improved, and the possibility of damaging the photosensitive film is further decreased. In a case where the volume average particle diameter is less than 50 nm, aggregation tends to easily occur, and an effect of addition of the fluorine resin particulate becomes insufficient. Meanwhile, in a case where the volume average particle diameter is over 200 nm, there is the fear that the photosensitive film is damaged.

Still further, in the invention, it is preferable that the fluorine resin particulate is polytetrafluoroethylene particulate.

According to the invention, it is preferable to use polytetrafluoroethylene particulate (hereinafter, occasionally referred to as the "PTFE particulate") as the fluorine resin particulate. Since the PTFE particulate has favorable wettability on the synthetic resin of the base material, and has particularly low surface energy, the particle diameter of the secondary particles becomes smaller. As a result, dispersiveness in the base material is outstandingly improved, and it is possible to achieve further reduction of the surface energy of the cleaning blade of the invention, enhancement of the cleaning capability, extension of the life for keeping the cleaning capability at high level, and so on.

Still further, in the invention, it is preferable that the synthetic resin of the base material is a synthetic resin having elasticity.

According to the invention, it is preferable that the synthetic resin used for the base material in the cleaning blade of the invention is a synthetic resin having elasticity. By employing this composition, regulation of the contact pressure of the cleaning blade to the photoreceptor drum is facilitated, and adhesion or fusion of the toner is further reduced, with the result that the possibility of damage of the photosensitive film is further decreased.

Still further, in the invention, it is preferable that the synthetic resin of the base material is polyester elastomer, polyurethane elastomer, fluorine rubber, or silicone rubber.

According to the invention, as the synthetic resin of the base material, it is possible to preferably use polyester elastomer, polyurethane elastomer, fluorine rubber, or silicone rubber. These synthetic resins have favorable wettability on the fluorine resin particulate, specifically, on the fluorine resin particulate having a volume average particle diameter of 50 nm through 200 nm. Therefore, it is possible to produce the cleaning blade of the invention in which the fluorine resin particulate is uniformly dispersed, with high productivity and at low cost. Moreover, the cleaning blades to be obtained have little individual difference and have almost uniform properties, and the defect rate thereof is remarkably low.

Still further, the invention provides an electrophotographic image forming apparatus comprising:

a photoreceptor drum;

a charging section for charging a surface of the photoreceptor drum;

an exposure section for exposing the surface of the photoreceptor drum with a signal light and forming an electrostatic latent image on the surface of the photoreceptor drum;

a developing section for supplying toner to the electrostatic latent image formed on the surface of the photoreceptor drum and forming a toner image;

a transfer section for transferring the toner image formed on the surface of the photoreceptor drum to a recording medium;

a fixing section for fixing the toner image onto the recording medium; and a cleaning section provided with the above-mentioned cleaning blade disposed so as to abut on the surface of the photoreceptor drum.

According to the invention, such an image forming apparatus is provided that comprises a photoreceptor drum, a charging section, an exposure section, a developing section, a transfer section, a fixing section, and a cleaning section having the cleaning blade of the invention. The image forming apparatus of the invention is capable of stably forming a high-quality image free from an image failure such as an image blur and a white line, all through the service life of the photoreceptor drum.

Still further, in the invention, it is preferable that a content of a release agent of the toner is 5% or more of a whole weight.

According to the invention, even when low-temperature-fixing toner in which the content of a release agent is 5% or more of the whole weight is used, the image forming apparatus of the invention is capable of stably forming a high-quality image free from an image failure such as an image blur and a white line, all through the service life of the photoreceptor drum, as in a case where toner in which the content of the release agent is about 1% through 2% and which is obtained by the melting, kneading and grinding method employed in general is used.

Still further, in the invention, it is preferable that the charging section charges the surface of the photoreceptor drum in a state of contacting with the photoreceptor drum.

According to the invention, in the image forming apparatus of the invention, it is preferable to use, as the charging section, a contact-charging-type charging section that charges the photosensitive film on the surface of the photoreceptor drum, to a predetermined potential and polarity, in contact with the photoreceptor drum. In a case where the contact-charging-type charging section that produces little ozone is used, the state of the surface of the photoreceptor drum greatly influences a charge potential. When toner filming occurs on the surface of the photoreceptor drum, the value of surface resistance increases, and the contact pressure varies, so that it becomes impossible to charge the surface of the photoreceptor drum to the predetermined potential. Meanwhile, in the image forming apparatus of the invention, the surface of the photoreceptor drum is cleaned securely and remarkably, and the amount of film thickness decrease of the photosensitive film is little. Consequently, it is possible to uniformly charge the surface of the photoreceptor drum, while making good use of the merit of the contact-charging-type charging apparatus that produces little ozone.

Still further, according to the invention, it is preferable that the cleaning blade abuts on the surface of the photoreceptor drum at linear pressure of $9.8 \times 10^{-3}$ N/cm through $29.4 \times 10^{-3}$ N/cm.

According to the invention, the contact pressure of the cleaning blade to the photoreceptor drum is made to be $9.8 \times 10^{-3}$ N/cm through $29.4 \times 10^{-3}$ N/cm, whereby lowness of the surface energy of the cleaning blade is exhibited efficiently in particular. In the case of less than $9.8 \times 10^{-3}$ N/cm, there is the fear of deterioration of the cleaning capability. Meanwhile, in the case of more than $29.4 \times 10^{-3}$ N/cm, it is not preferable because the amount of film thickness decrease of the photosensitive film on the surface of the photoreceptor drum becomes large.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
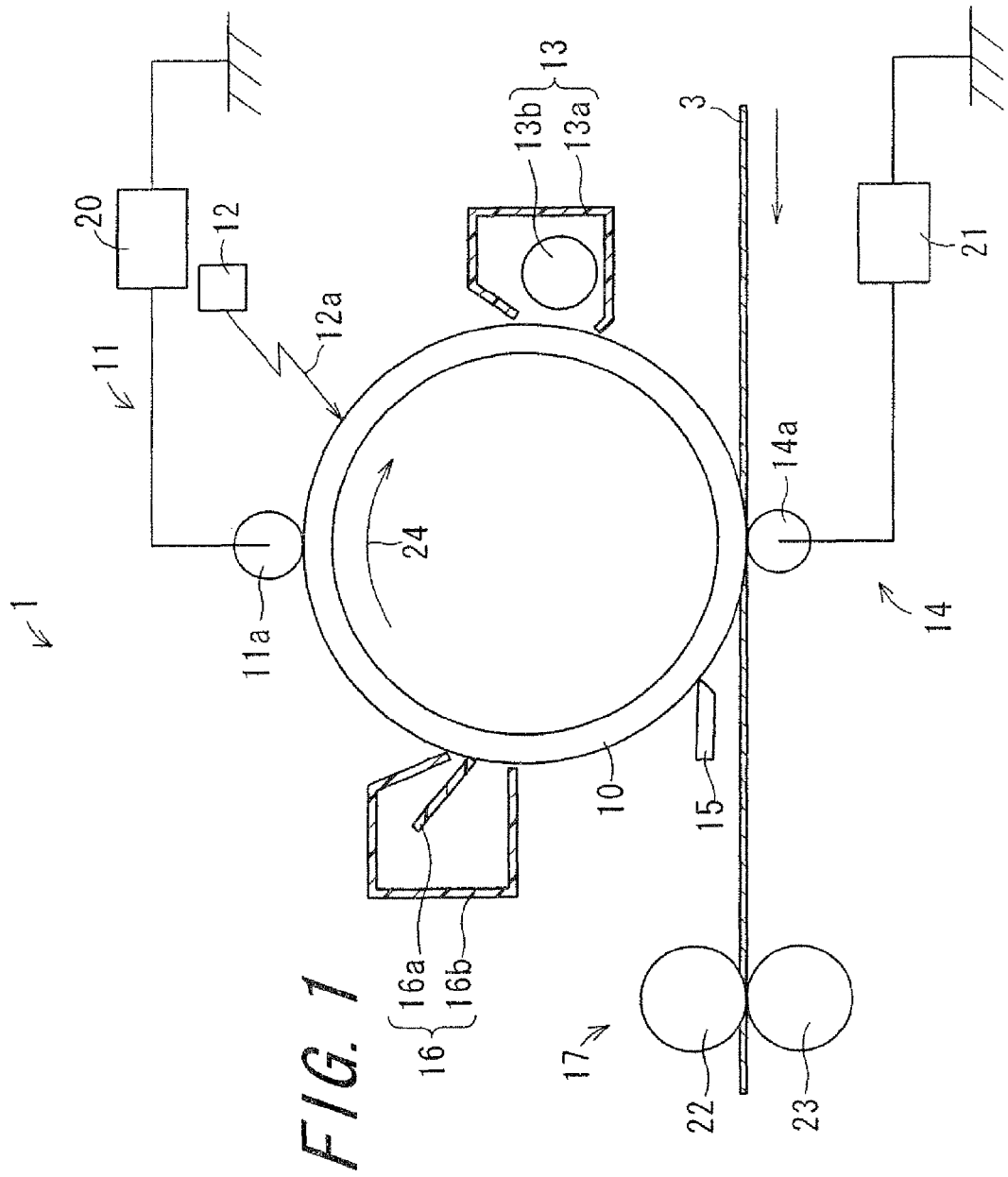
FIG. 1 is a cross section view schematically showing the configuration of an image forming apparatus according to one embodiment of the invention.

Now referring to the drawings, preferred embodiments of the invention are described below.

FIG. 1 is a cross section view schematically showing the configuration of an image forming apparatus 1 according to one embodiment of the invention. The image forming apparatus 1 forms an image on a recording medium 3 such as a recording sheet, in accordance with image information included in a printing instruction from an external apparatus. As the external apparatus, it is possible to use electric/electronic equipment that is capable of forming or obtaining image information and that can be electrically connected to the image forming apparatus 1. Examples of such equipment include a computer, a digital camera, a television, a video recorder, a DVD recorder, and a facsimile apparatus. The image forming apparatus 1 comprises a photoreceptor drum 10, a charging section 11, an exposure section 12, a developing section 13, a transfer section 14, a peeling section 15, a cleaning section 16 and a fixing section 17.

The photoreceptor drum 10 is a roller-like member that is supported so as to be capable of rotating about an axis thereof (in a direction of arrow 24) by a driving mechanism (not shown in the drawing) and that has, on the surface, a photosensitive film on which an electrostatic latent image and then a toner image is formed. As the photoreceptor drum 10, it is possible to use, for example, a photoreceptor drum that includes a conductive base and a photosensitive film formed on the surface of the conductive base. As the conductive base, it is possible to use a conductive base formed like a cylinder, a column, a sheet, or the like. In particular, a cylindrical conductive base is preferable. The photosensitive film is, for example, an organic photosensitive film, or an inorganic photosensitive film. The organic photosensitive film is, for example, a lamination composed of a charge generating layer that is a resin layer containing a charge generating substance and a charge transporting layer that is a resin layer containing a charge transporting substance, or a lamination including the charge generating substance and the charge transporting substance in one resin layer. The inorganic photosensitive film is, for example, a film that contains one kind or two kinds or more selected from among zinc oxide, selenium, amorphous silicon, and so on. An undercoat film may be interposed between the conductive base and the photosensitive film. A surface film (protection film) that chiefly protects the photosensitive film may be disposed to the surface of the photosensitive film.

The charging section 11 includes a charging roller 11a and a power source 20. The charging roller 11a is a roller-like member disposed so as to be capable of rotating about an axis thereof by a driving mechanism (not shown) and so as to abut on the photoreceptor drum 10. With application of voltage from the power source 20, the charging roller 11a charges the surface of the photoreceptor drum 10 to a predetermined polarity and potential. The charging roller 11a has a charging capability of being capable of uniformly charging the surface of the photoreceptor drum 10. The charging capability is kept at a high level all through the service life of the image forming apparatus 1. Moreover, the charging roller has the merit that the ozone production is small. Meanwhile, since the charging roller is placed so as to come in contact with the photoreceptor drum 10, the charging roller has the demerit that when toner, paper dust or the like adheres to the photoreceptor drum 10, the charging roller is contaminated by the toner, paper dust or the like and the charging capability deteriorates. However, in the image forming apparatus 1 of the invention, the surface of the photoreceptor drum 10 is remarkably cleaned by the cleaning section 16 described later, so that the excellent charging capability of the charging roller 11a will not deteriorate. Incidentally, a charging roller that charges the surface of the photoreceptor drum 10 in a state of contacting therewith is used as the charging section 11 in the present embodiment, but it is possible to use not only the aforementioned one but also a corona charging device, a brush-type charging device, a charger-type charging device, or the like.

The exposure section 12 irradiates the surface of the photoreceptor drum 10 with a signal light 12a corresponding to image information and forms an electrostatic latent image corresponding to the image information. The image information is included in a printing instruction inputted to the image forming apparatus 1. In the present embodiment, a laser scanning unit (not shown; hereinafter, occasionally referred to as the "LSU") is used as the exposure section 12. The LSU includes a laser emitting section and a laser reflecting section.

The laser emitting section emits the signal light 12a corresponding to the image information. Although a semiconductor laser is used as the laser emitting section, it is possible to use not only the aforementioned one but also an electroluminescence (EL) device, a light emitting diode (LED) device, or the like. The laser reflecting section reflects the signal light 12a emitted by the laser emitting section to make the signal light reach the surface of the photoreceptor drum 10. Consequently, an electrostatic latent image corresponding to the image information is formed on the surface of the photoreceptor drum 10. As the laser reflecting section, a reflection mirror can be used.

The developing section 13 includes a developing tank 13a, a developing roller 13b, a layer-thickness regulating member (not shown), a supply roller (not shown), an agitation member (not shown), a toner hopper (not shown), and a toner cartridge (not shown), thereby supplying toner to the electrostatic latent image formed on the surface of the photoreceptor drum 10 to form a toner image. The developing tank 13a is a container-like member having an internal space. In the internal space, the developing tank 13a holds the developing roller 13b, the supply roller and the agitation member so that the axes of these components become parallel to each other, and supports so as to freely rotate. The developing tank 13a holds and supports the layer-thickness regulating member, and further holds a developer. The developer may be either a one-component developer containing only toner or a two-component developer containing toner and carrier. The developing roller 13b is separated from the surface of the photoreceptor drum 10, and is disposed so that the axis thereof becomes parallel to the axis of the photoreceptor drum 10 and so as to be capable of rotating about the axis thereof by a driving mechanism (not shown). The developing roller 13b rotates while bearing the developer on the surface thereof mainly by electrical attraction and, at a closest portion to the photoreceptor drum 10 (a development nip portion), supplies the toner to the electrostatic latent image formed on the surface of the photoreceptor drum 10, with application of development bias voltage by a power source (not shown).

The layer-thickness regulating member is a plate-like member, whose one end in the short-side direction is supported by the developing tank 13a, and whose other end has a predetermined interval from the surface of the developing roller 13b. The layer-thickness regulating member regulates the layer thickness of a developer layer borne on the surface of the developing roller 13b. Each of the supply roller and the agitation member is a roller-like member disposed so as to be capable of rotating about the axis thereof by a driving mechanism (not shown). By rotating, the supply roller charges the developer and supplies to the surroundings of the developing roller 13b. The agitation member uniformly mixes the toner re-supplied from the toner hopper (not shown) depending on the condition or toner consumption and the developer held in the developing tank 13a, and then supplies to the surroundings of the supply roller. Each of the supply roller and the agitation member may be a screw-like member.

The toner hopper is a container-like member that is disposed upward in the vertical direction with respect to the developing tank 13a so as to be connected with the upper face in the vertical direction of the developing tank 13a or so as to be separated from the developing tank 13a, and that has an internal space. The toner hopper re-supplies the toner to the developing tank 13a depending on the condition of toner consumption in the developing tank 13a. In a case where the toner hopper is disposed so as to be separated from the developing tank 13a, the toner hopper and the developing tank 13a are connected by a toner re-supply tube (not shown). The toner cartridge is a container-like member with a cylindrical shape having an internal space, and stores the toner in the internal space. On a side face in the long-side direction of the toner cartridge, a toner re-supply hole extending in the long-side direction is formed. Moreover, the toner cartridge is disposed so as to be freely attached to and detached from the image forming apparatus 1, and attached to the main unit of the image forming apparatus 1 so that the long-side direction coincides with the horizontal direction. Moreover, while being attached to the image forming apparatus 1, the toner cartridge rotates about the axis thereof by a driving mechanism (not shown). The toner cartridge supplies the toner to the toner hopper depending on the condition of toner consumption in the toner hopper. For example, re-supply of the toner from the toner cartridge to the toner hopper is executed by rotating the toner cartridge and dropping the toner from the toner re-supply hole. When the toner held in the toner cartridge is used up, the toner cartridge is replaced with a new one.

In the present embodiment, the toner is not limited specifically, and toner produced by any known production method can be used, but it is favorable to use toner that contains a release agent by 5% or more of the whole weight, and preferably 5% through 15% of the whole weight, and provided with low-temperature fixability. This low-temperature-fixable toner can be produced by, for example: melting and kneading a synthetic resin, a coloring agent and a release agent, as well as a toner additive such as a charge control agent if necessary, by predetermined amounts; solidifying an obtained melt-and-kneaded substance; and mechanically grinding an obtained solidified substance. Among toners obtained in this way, toner having a volume average particle diameter of 4 μm through 9 μm is preferable. In the invention, low-temperature-fixable toner produced by the aforementioned melting, kneading and grinding method in which the concentration of a release agent is 5% or more of the whole weight can be used favorably in particular.

As the synthetic resin, it is possible to use one that is generally used for toner. Examples of the synthetic resin include: polyvinyl chloride; polyvinyl acetate; polyethylene; polypropylene; polyester; polyamide; styrene polymer; (meth)acrylic acid polymer; polyvinyl butyral; silicone resin; polyurethane; epoxy resin; phenol resin; xylene resin; rosin-modified resin; terpene resin; aliphatic hydrocarbon resin; alicyclic hydrocarbon resin; aromatic petroleum resin; chlorinated paraffin; and paraffin wax. As a binding resin, one kind or two kinds or more of them can be used. Among them, it is preferable to use polyester, styrene polymer, (meth) acrylic acid polymer, or the like.

As polyester, it is preferable to use polycondensation of polyalcohol and polycarboxilic acid. Examples of polyalcohol include: aliphatic alcohol such as ethylene glycol, propylene glycol, 1,3-butanediol, 1,4-butanediol, 2,3-butanediol, diethylene glycol, 1,5-pentanediol, 1,6-hexanediol and neopentyl glycol; alicyclic alcohol such as cyclohexane dimethanol and hydrogenated bisphenol; and alkylene oxide adducts of bisphenol A such as ethylene oxide adducts of bisphenol A and propylene oxide adducts of bisphenol A. As polyalcohol, one kind or two kinds or more of them can be used. Examples of polycarboxilic acid include: aromatic carboxylic acid and acid anhydride thereof, such as phthalic acid, terephthalic acid and phthalic anhydride; and saturated and unsaturated aliphatic carboxylic acid and acid anhydride thereof, such as succinic acid, adipic acid, sebacic acid, azelaic acid and dodecenyl succinic acid. As polycarboxilic acid, one kind or two kinds or more of them can be used.

Examples of styrene polymer include: homopolymer of styrene monomer; and copolymer of styrene monomer and monomer that can be copolymerized with styrene monomer. Examples of styrene monomer include: styrene; o-methyl styrene; ethyl styrene; p-methoxy styrene; p-phenyl styrene, 2,4-dimethyl styrene; p-n-octyl styrene; p-n-decyl styrene; and p-n-dodecyl styrene. Examples of other monomer include: (meth)acrylates such as methyl(meth)acrylate, ethyl (meth)acrylate, propyl(meth)acrylate, butyl(meth)acrylate, isobutyl(meth)acrylate, n-octyl(meth)acrylate, dodecyl (meth)acrylate, 2-ethylhexyl(meth)acrylate, stearyl(meth) acrylate, phenyl(meth)acrylate and dimethylamino ethyl (meth)acrylate; (meth)acrylic monomers such as acrylonitrile, methacrylamide, glycidyl methacrylate, N-methylol acrylamide, N-methylol methacrylamide and 2-hydroxyethyl acrylate; vinyl ethers such as vinyl methyl ether, vinyl ethyl ether and vinyl isobutyl ether; vinyl ketones such as vinyl methyl ketone, vinyl hexyl ketone and methyl isopropenyl ketone; and N-vinyl compounds such as N-vinyl pyrrolidone, N-vinyl carbazole and N-vinyl indole. As styrene monomer and monomer that can be copolymerized with styrene monomer, one kind or two kinds or more of them can be used, respectively.

Examples of (meth)acrylic acid polymer include: homopolymer of (meth)acrylate; and copolymer of (meth) acrylate an monomer that can be copolymerized with (meth) acrylate. As (meth)acrylate, it is possible to use the same one as mentioned above. Examples of monomer that can be copolymerized with (meth)acrylates include: (meth)acrylic monomers; vinyl ethers; vinyl ketones; and N-vinyl compounds. As these monomers, it is possible to use the same ones as mentioned above.

Incidentally, it is also possible to use a binding resin obtained by binding hydrophilic group such as carboxyl group and sulfonic group to main chain and/or side chain of a binding resin, and giving a self-dispersive property in water thereto.

As a coloring agent, it is possible to use, for example, black-color pigments, chromatic pigments, and so on. Examples of black-color pigments include: black-color inorganic pigments such as carbon black, copper oxide, manganese dioxide, activated carbon, nonmagnetic ferrite, magnetic ferrite and magnetite; and black-color organic pigments such as aniline black. Examples of chromatic pigments include: yellow-color inorganic pigments, yellow-color organic pigments, orange-color inorganic pigments, orange-color organic pigments, red-color inorganic pigments, red-color organic pigments, purple-color inorganic pigments, purple-color organic pigments, blue-color inorganic pigments, blue-color organic pigments, green-color inorganic pigments, and green-color organic pigments.

Examples of yellow-color inorganic pigments include: chrome yellow, zinc yellow, cadmium yellow, yellow iron oxide, mineral fast yellow, nickel titanium yellow, and navel yellow. Examples of yellow-color organic pigments include: naphthol yellow S, Hansa yellow G, Hansa yellow 10G, benzidine yellow G, benzidine yellow GR, quinoline yellow lake, permanent yellow NCG, and tartrazine lake.

Examples of orange-color inorganic pigments include: red chrome yellow, and molybdenum orange. Examples of orange-color organic pigments include: permanent orange GTR, pyrazolone orange, Balkan orange, indathrene brilliant orange RK, benzidine orange G, and indathrene brilliant orange GK.

Examples of red-color inorganic pigments include: red iron oxide, cadmium red, red lead, mercuric sulfide, and cadmium. Examples of red-color organic pigments include:

permanent red 4R, lithol red, pyrazolone red, watching red, calcium salt, lake red C, lake red D, brilliant carmine 6B, eosin lake, rhodamine lake B, alizarin lake, and brilliant carmine 3B.

Examples of violet-color inorganic pigments include: manganese violet. Examples of violet-color organic pigments include: fast violet B, and methyl violet lake.

Examples of blue-color inorganic pigments include: iron blue, and cobalt blue. Examples of blue-color organic pigments include: alkali blue lake, Victoria blue lake, phthalocyanine blue, metal-free phthalocyanine blue, partly chlorinated product of phthalocyanine blue, fast sky blue, and indathrene blue BC.

Examples of green-color inorganic pigments include: chrome green, and chrome oxide. Examples of green-color organic pigments include: pigment green B, malachite green lake, and final yellow green G. As the coloring agent, one kind or two kinds or more of them can be used. Two kinds or more of coloring agents of the same color may be used, or coloring agents of different colors may be mixed and used. A preferable content of the coloring agent is in a range of from 1% by weight to 20% by weight of the whole amount of the toner particulate.

Examples of the release agent include: natural wax such as carnauba wax, and rice wax; aliphatic hydrocarbon wax such as low-polymer polyethylene, low-polymer polypropylene, micro crystalline wax, and paraffin wax; and fatty acid wax such as montanic acid ester wax. As the release agent, it is possible to use one kind or two kinds or more. A preferable content of the release agent is 5% by weight or more of the whole amount of the toner particulate, and a further preferable content is in a range of from 5% by weight to 11% by weight.

Examples of the charge control agent include: a charge control agent for negative-charge toner such as metallized azo dye (chrome azo complex dye, iron azo complex dye, cobalt azo complex dye, or the like), copper phthalocyanine dye, metal (chrome, zinc, aluminum, boron, or the like) complex and salt of salicylic acid and alkyl derivative thereof, metal (chrome, zinc, aluminum, boron, or the like) complex and salt of naphthol acid and derivative thereof, metal (chrome, zinc, aluminum, boron, or the like) complex and salt of benzilic acid and derivative thereof, long-chain alkyl carboxylate, and long-chain alkyl sulfonate; nigrosine dye and derivative thereof; benzoguanamine; triphenylmethane derivative; quarternary ammonium salt; quarternary phosphonium salt; quarternary pyridinium salt; guanidine salt; amidine salt; and radical polymerizable copolymer of monomer having nitrogenous functional group [N,N-dialkylamino alkyl(meth)acrylates such as N,N-dimethylamino methyl(meth)acrylate, N,N-dimethyl amino ethyl(meth)acrylate and N,N-diethylamino ethyl(meth)acrylate, N,N-dialkylaminoalkyl(meth)acrylamides such as N,N-dimethylamino ethyl(meth)acrylamide and N,N-dimethyl amino propyl(meth)acrylamide, or the like]. As the charge control agent, one kind or two kinds or more of them can be used. A preferable content of the charge control agent is in a range of from 0.1% by weight to 5.0% by weight of the whole amount of the toner particulate.

The general toner additive is, for example, inorganic particulate and organic particulate. A preferable volume average particle diameter of the inorganic particulate and organic particulate is about $1.0 \times 10^{-3}$ through $3.0 \times 10^{-2}$ times the volume average particle diameter of the toner. The inorganic particulate is, for example: silica-containing particulate such as silicon dioxide, aluminum silicate, zinc silicate, and magnesium silicate; nitride particulate such as silicon nitride; carbide particulate such as silicon carbide; aliphatic metal salt such as calcium sulfate, barium sulfate, calcium carbonate, zinc stearate, and calcium stearate; simple metal particulate such as iron, cobalt, nickel, copper, and aluminum; and metal oxide particulate such as zirconium oxide, silicon oxide, tin oxide, titanium oxide, zinc oxide, aluminum oxide, cerium oxide, magnesium oxide, chrome oxide, manganese oxide (hematite, maghematite, or the like), ferrite, barium titanate, and strontium titanate. The organic particulate is, for example, particulate composed of polyester, acrylic resin, polystyrene, styrene-acrylic resin, polyurethane, or the like. As the inorganic particulate and the organic particulate, it is possible to use one kind or two kinds or more, respectively. The inorganic particulate and the organic particulate may be used together. A preferable use amount of the inorganic particulate and/or organic particulate is in a range of from 0.5 part by weight to 20 parts by weight with respect to 100 parts by weight of the binding resin.

In this specification, the volume average particle diameter of the toner and fluorine resin particulate is a value obtained in the following manner. A sample for measurement is prepared by: adding 20 mg of a sample and 1 ml of alkyl ether sulfate sodium into 50 ml of an electrolyte solution (product name: ISOTON-II, produced by Beckman Coulter, Inc.); and executing a dispersion process for three minutes at ultrasound frequency of 20 kz with an ultrasonic dispersion apparatus (product name: UH-50, produced by STM). For this measurement sample, measurement is performed with a particle size distribution analyzer (product name: Multisizer 2, produced by Beckman Coulter, Inc.) under the condition that the aperture diameter is 100 μm and the number of particles to be measured is 50000 and, based on the volume particle size distribution of the sample particles, the volume average particle diameter can be calculated.

The transfer section 14 includes a transfer roller 14a and a power source 21. The transfer roller 14a is a roller-like member that is supported by a supporting section (not shown) as to freely rotate, disposed so as to be capable of rotating by a driving mechanism (not shown), and disposed so as to pressure-contact the surface of the photoreceptor drum 10. A pressure-contact portion between the transfer roller 14a and the photoreceptor drum 10 is a transfer nip portion. As the transfer roller 14a, for example, a roller-like member including a metallic core bar having a diameter of 8 mm through 10 mm and a conductive elastic layer formed on the surface of the metallic core bar is used. As the metal that composes the metallic core bar, it is possible to use stainless steel, aluminum, or the like. As the conductive elastic layer, it is possible to use a rubber material obtained by mixing a conductive material such as carbon black to a rubber material such as ethylene-propylene diene rubber (EPDM), foamed EPDM, and foamed urethane. The power source 21 is electrically connected to the transfer roller 14a, and applies transfer bias voltage to the transfer roller 14a when a toner image on the surface of the photoreceptor drum 10 is transferred to the recording medium 3. The transfer bias voltage is voltage of the opposite polarity to charging polarity of the toner constituting the toner image. Application of the transfer bias voltage enables smooth execution of transfer of the toner image to the recording medium 3. In the transfer section 14, the recording mediums 3 are supplied one by one from a paper-feeding tray (not shown) to the transfer nip portion via a pickup roller and registration roller (not shown), in synchronization with conveyance of the toner image with rotation of the photoreceptor drum 10. The recording medium 3 passes through the transfer nip portion, whereby the toner image on the surface of the photoreceptor drum 10 is transferred onto the recording medium 3. According to the transfer section 14, the toner image on the photoreceptor drum 10 is transferred onto the recording medium.

The peeling section 15 is a plate-like member that extends in parallel to the long-side direction of the photoreceptor drum 10 and that is disposed so that one end of the short-side direction abuts on the surface of the photoreceptor drum 10. The peeling section 15 prevents the recording medium 3 after transfer of the toner image from winding around the photoreceptor drum 10, and feeds the recording medium toward the fixing section 17.

The cleaning section 16 includes a cleaning blade 16a and a toner storage tank 16b. The cleaning blade 16a is a plate-like member that extends in parallel to the long-side direction of the photoreceptor drum 10, that is disposed so that one end of the short-side direction abuts on the surface of the photoreceptor drum 10, and that removes paper dust or the like coming from the recording medium 3 from the surface of the photoreceptor drum 10. A preferable contact pressure of the cleaning blade 16a to the surface of the photoreceptor drum 10 is in a range of from $9.8 \times 10^{-3}$ N/cm to $29.4 \times 10^{-3}$ N/cm (from 10 g/cm to 30 g/cm) at linear pressure. In the case of less than $9.8 \times 10^{-3}$ N/cm, even if the cleaning blade 16a having the configuration according to the invention is used, the excellent cleaning capability will not be exerted sufficiently, and there is the fear that the cleaning capability for the surface of the photoreceptor drum 10 deteriorates. On the other hand, in the case of more than $29.4 \times 10^{-3}$ N/cm, the amount of film thickness decrease of the photosensitive film on the surface of the photoreceptor drum 10 becomes large, and the service life of the photoreceptor drum 10 is shortened. The toner storage tank 16b is a container-like member having an internal space, and temporarily stores toner removed by the cleaning blade 16a.

In the present embodiment, the cleaning blade 16a is formed by a resin composition obtained by dispersing 15 part by weight through 33 parts by weight, preferably, 18 parts by weight through 30 parts by weight of fluorine resin particulate and secondary particles thereof into 100 parts by weight of a synthetic resin of a base material. In a case where the addition amount of the fluorine resin particulate and secondary particles thereof into the synthetic resin is less than 15 parts by weight, an advantage of addition of the fluorine resin particulate is not sufficiently taken, and the surface energy of the cleaning blade 16a does not decrease enough. As a result, in a case where low-temperature-fixable toner containing the release agent by a ratio of 5% or more of the whole weight is used, filming and adhesion or fusion of the toner occur, so that a desired cleaning capability cannot be obtained. Meanwhile, in a case where the ratio is more than 30 parts by weight, hyper-aggregation of the fluorine resin particulate occurs when the fluorine resin particulate and the synthetic resin of the base material are mixed, so that a large amount of rough and large secondary particles is generated. As a result, the surface of the cleaning blade 16a becomes uneven, and the cleaning capability deteriorates. Moreover, the moldability of the resin composition obtained by dispersing the fluorine resin particulate becomes worse, with the result that it becomes difficult to produce the cleaning blade 16a with efficiency and at a low defect rate. Moreover, the cleaning blade 16a becomes less elastic and may damage the photoreceptor drum 10, and the cleaning blade 16a itself becomes easy to chip and crack.

Further, in observation of the short-side cross section of the cleaning blade 16a with a scanning electron microscope, the number of the secondary particles of the fluorine resin particulate having a particle diameter of 0.5 μm or more is 50 or less per unit area (100 μm$^2$). Since a plurality of particle diameters can be observed for each secondary particle, the particle diameter herein refers to one that has the maximum length among the observable particle diameters. In a case where the number of secondary particles having a particle diameter of 0.5 μm or more is more than 50 per unit area, uniform dispersiveness of the fluorine resin particulate in the synthetic resin of the base material is impaired, and the cleaning capability of the cleaning blade 16a deteriorates.

Although any synthetic resin generally used as the material of a cleaning blade in this field can be used as the synthetic resin of the base material in the cleaning blade 16a, a synthetic resin having elasticity is favorable specifically. Examples of the synthetic resin having elasticity include: polyester elastomer, polyurethane elastomer, fluorine rubber, and silicone rubber. In particular, polyurethane elastomer, silicone rubber or the like can be used preferably. Polyurethane elastomer can be produced by making polyol and polyisocyanate react. Polyol is not limited specifically, and it is possible to use polyester polyol, polyether polyol, or the like.

Polyester polyol can be produced by making polybasic acid and polyol (which is diol, triol, hexaol or the like herein, and is different from the aforementioned polyol) react. Examples of polybasic acid include: dicarboxylic acid such as saturated fatty acid like oxalic acid, succinic acid, glutaric acid, adipic acid, pimelic acid, suberic acid, azelaic acid, sebacic acid and isosebacic acid, unsaturated fatty acid like maleic acid and fumaric acid, and aromatic fatty acid like phthalic acid, isophthalic acid and terephthalic acid; acid anhydride such as maleic acid anhydride, and phthalic acid anhydride; aromatic fatty acid dialkyl ester such as dimethyl terephthalate; and dimer acid obtained by dimerization of unsaturated fatty acid. As polybasic acid, one kind of them may be used alone, or two kinds or more of them may be used in combination. Examples of polyol include: diol such as ethylene glycol, diethylene glycol, triethylene glycol, propylene glycol, dipropylene glycol, butylene glycol, neopentyl glycol, and 1,6-hexylene glycol; triol such as trimethylol ethane, trimethylol propane, hexane triol, and glycerin; and hexaol such as sorbitol. As polyol, one kind of them may be used alone, or two kinds or more of them may be used in combination.

Polyether polyols can be produced by, for example, ring-opening polymerization or copolymerization of cyclic ether. Examples of cyclic ether include: ethylene oxide; propylene oxide; trimethylene oxide; butylene oxide; α-methyl trimethylene oxide; 3,3-dimethyl trimethylene oxide; tetrahydrofuran; dioxane; and dioxamine. As polyol, one kind of them may be used alone, or two kinds or more of them may be used in combination. In consideration of the abrasion resistance of a cleaning blade to be obtained, polyester polyol obtained by using dicarboxylic acid and diol is favorable among these polyols. Polyethylene adipate (PEA), polybutylene adipate (PBA), polyhexylene adipate, copolymer of ethylene adipate and buthylene adipate, and the like are more favorable. Further, polyurethane elastomer can be obtained also by: making ethylene adipate and one kind or two kinds or more of polyisocyanates described later react to produce pre-polymer or pre-polymer rubber before curing; and making this pre-polymer or pre-polymer rubber and one kind or two kinds or more of polyols react. Furthermore, polycarbonate polyol obtained by reaction of diol and alkyl carbonate, polyoxytetramethylene ether glycol, or the like can also be used as polyols. As polyol, one kind of them may be used alone, or two kinds or more of them may be used in combination.

Examples of polyisocyanate include: aromatic diisocyanate compound such as 4,4'-diphenyl methane diisocyanate (MDI), hydrogenated 4,4'-diphenyl methane diisocyanate (HMDI), 2,4-tolylene diisocyanate (2,4-TDI), 2,6-tolylene diisocyanate (2,6-TDI), 3,3'-bitolylene-4,4'-diisocyanate, 3,3'-dimethyl diphenyl methane-4,4'-diisocyanate, 2,4-tolylene diisocyanate uretidine dion (a dimer of 2,4-TDI), 1,5-naphthylene diisocyanate, metaphenylene diisocyanate, hydrogenated m-xylylene diisocyanate (HXDI), carbodiimide modified MDI, ortho toluidine diisocyanate, xylene diisocyanate, and para phenylene diisocyanate; fatty acid diisocyanate compound such as ethylene diisocyanate, 2,2,4-trimethyl hexamethylene diisocyante, and 1,6-hexamethylene diisocyanate (HDI); and alicyclic diisocyanate compound such as 1,4-cyclohexane diisocyanate (CHDI), isophorone diisocyanate (IPDI), methyl cyclohexylene diisocyanate, 4,4'-dicyclohexyl methane diisocyanate (hydrogenated MDI), and norbornane diisocyanate. There is triisocyanate such as triphenylmethane-4,4',4"-triisocyanate, polymeric MDI, or the like. In consideration of the abrasion resistance of a cleaning blade to be obtained, MDI is favorable among them. As polyisocyanate, one kind of them may be used alone, or two kinds or more of them may be used in combination.

In polyurethane elastomer used in the invention, it is possible to use a chain extender, a cross-linking agent and so on together with polyol and polyisocyanate. The chain extender is, for example, polyol having molecular weight of 300 or less. Specific examples of polyol having molecular weight of 300 or less include: 1,4-butanediol (1,4-BD); ethylene glycol; diethylene glycol; propylene glycol; dipropylene glycol; hexanediol; 1,4-cyclohexane diol; 1,4-cyclohexane dimethanol; xylene glycol; triethylene glycol; trimethylol propane (TMP); glycerin; pentaerythritol; sorbitol; and 1,2,6-hexane triol. As the chain extender, one kind of them may be used alone, or two kinds or more of them may be used in combination. The cross-linking agent is diol, triol, or the like. Diol is, for example, propane diol (PD), butane diol (BD), and 3,5-diethylthio-2,4-toluene diamine. As triol, triol having molecular weight of 120 through 2500 is favorable, and triol having molecular weight of 120 through 1000 is more favorable. Specific examples include short-chain triol such as trimethylol ethane (TME) and trimethylol propane (TMP), triol synthesized from ε-caprolactone, and the like. As diol and triol, respectively, one kind of them may be used alone or two kinds or more of them may be used in combination. Although the use ratio between diol and triol is not limited in specific, it is favorable that the ratio of diol:triol (weight ratio) is 50:50 through 95:5. It is more favorable that the ratio of diol:triol is 60:40 through 90:10. The reaction can be executed by using a common method for producing polyurethane, such as a pre-polymer method, a one-shot method and a semi-one-shot method.

Further, it is possible to add common additives such as a foaming agent, a surface active agent, a flame retardant, a coloring agent, a filler, a plasticizer, a stabilizer and a release agent, by appropriate amounts to polyurethane elastomer of the invention.

Polyurethane elastomer used in the invention can be produced by making polyol and polyisocyanate react in the presence of or in the absence of a catalyst. At this moment, if necessary, a chain extender, a cross-linking agent or the like may be made to exist in a reaction system and reacted with polyol and/or polyisocyanate. The catalyst is, for example, diazabicyclo amine salt, amine compound, organic tin compound, or the like. Specific examples of diazabicyclo amine salt include 1,8-diazabicyclo(5,4,0)-undecene-7 (DBU), and 1,5-diazabicyclo(4,3,0)-nonene-5 (DBN). The amine compound is, for example, tertiary amine compound. Specific examples of tertiary amine compound include: trialkyl amine such as triethyl amine; tetraalkyl diamine such as N,N,N',N'-tetramethyl-1,3-butane diamine; amino alcohol such as dimethyl ethanol amine; ethoxylated amine; ethoxylated diamine; ester amine such as bis(diethyl ethanol amine) adipate; triethylene diamine (TEDA); cyclohexyl amine compound such as N,N-dimethyl cyclohexyl amine; morpholine compound such as N-methyl morpholine and N-(2-hydroxypropyl)-dimethyl morpholine; and piperazine compound such as N,N'-diethyl-2-methyl piperazine and N,N'-bis-(2-hydroxy propyl)-2-methyl piperazine. Specific examples of the organic tin compound include dialkyl tin compound such as dibutyl tin dilaurate and dibutyl tin di(2-ethyl hexoate); stannous 2-ethyl caproate; and stannous oleate.

Examples of the silicone rubber include millable silicone rubber and liquid silicone rubber. The millable silicone rubber is silicone rubber obtained by adding a vulcanizing agent to straight-chain polyorgano siloxane, and heating and curing. Straight-chain polyorgano siloxane is, for example, dimethyl polysiloxane, methyl vinyl polysiloxane, methyl phenyl methyl vinyl polysiloxane, and methyl fluoro alkyl polysiloxane. As the vulcanizing agent, it is possible to use one that is generally used in this field, which is alkyl organic peroxide, acyl organic peroxide, platinum compound, or the like. Addition of the vulcanizing agent to straight-chain polyorgano siloxane is performed by, for example, mixing and kneading straight-chain polyorgano siloxane and the vulcanizing agent in a mixing machine such as a banbury mixer. The liquid silicone rubber is: condensed silicone rubber that hardens at room temperatures; addition silicone rubber that hardens when heated in the presence of a catalyst such as a platinum catalyst; ultraviolet cure silicone rubber; or the like. It is possible to mix a general filler for increasing mechanical strength and various additives by appropriate amounts to the silicone rubber. The mechanical strength increasing filler is, for example, inorganic particulate of silica, diatom earth, quartz, calcium carbonate, or the like.

Further, the fluorine resin particulate used in the invention is granulated fluorine resin. Examples of the fluorine resin include: polytetrafluoroethylene (PTFE); copolymer of tetrafluoroethylene and perfluoro alkyl vinyl ether (PFA); copolymer of tetrafluoroethylene and hexafluoro propylene (FEP); copolymer of tetrafluoroethylene and ethylene (ETFE); polychloro trifluoro ethylene (CTFE); polyvinylidene fluoride (PVDF); and a mixture composed of two kinds or more thereof. There are various commercial items known as the fluorine resin particulate, and it is also possible to use such commercial items in the invention. Specific examples of the commercial items include: dyneon (product name, PTFE particulate produced by Sumitomo 3M Ltd.); KD-500AS (product name, PTFE particulate with volume average particle diameter of 0.3 μm and average molecular weight of 3000, produced by Kitamura Ltd.); Lubron™L-2 and L-2 (product names, low-molecular-weight PTFE particulates, produced by Daikin Industries, Ltd.); MP-1100, 1200, 1300, and TLP-10F-1 (product names, low-molecular-weight PTFE particulates, produced by DuPunt-Mitsui Fluorochemicals Co., Ltd.); MP-10 and MP-102 (product names, copolymers of tetrafluoroethylene and perfluoro alkyl vinyl ether (PFA), produced by DuPont-Mitsui Fluorochemicals Co., Ltd.); and 532-8000 (product name, copolymer of tetrafluoroethylene and hexafluoro propylene, produced by DuPont Ltd.). As these commercial items, one kind of them may be used alone, or two kinds or more of them may be used in combination. Among the fluorine resin particulates mentioned above, polytetrafluoroethylene particulate is favorable.

Although the particle diameter of the fluorine resin particulate is not limited in specific, it is preferable that the volume average particle diameter is in a range of from 50 nm to 200 nm. In a case where the volume average particle diameter is less than 50 nm, hyper-aggregation occurs when the fluorine resin particulate is mixed with the synthetic resin to become the base material, and rough and large secondary particles are generated, so that there is the fear that a sufficient cleaning capability cannot be obtained. In a case where the volume average particle diameter is more than 200 nm, the particles may damage the photosensitive film on the surface of the photoreceptor drum 10. Although the fluorine resin particulate can be added to the synthetic resin before curing as it is, it is preferable, in consideration of dispersion efficiency, to use in the form of a dispersed solution in which the particulate is dispersed in a solvent. Herein, the solvent is not limited in specific as far as the solvent does not dissolve or modify the fluorine resin, and a known solvent can be used. For example, aromatic hydrocarbons such as toluene and xylene can be used.

The cleaning blade 16a of the invention can be produced in a similar way as by a method for producing a general cleaning blade, except that in order to obtain the cleaning blade by curing and molding the synthetic resin of the base material, the fluorine resin particulate is mixed into the synthetic resin before curing and uniformly dispersed into the synthetic resin. A specific example of the case of using polyurethane elastomer as the synthetic resin of the base material and employing the semi-one-shot method is as described below. First, urethane pre-polymer is prepared by making a predetermined amount of polyisocyanate and a predetermined amount of polyol react. On the other hand, a curing agent solution is prepared by mixing a predetermined amount of polyol and appropriate amounts of a chain extender, a catalyst and so on as necessary. Next, a predetermined amount of the urethane pre-polymer and a predetermined amount of the curing agent solution are mixed, and a predetermined amount of the fluorine resin particulate is added to the obtained mixture to further mix and uniformly disperse the fluorine resin particulate. For dispersion of the fluorine resin particulate, a mixing machine such as a sand grinder or a ball mill can be used. By injecting and curing the obtained mixture in a die (not shown) for molding a cleaning blade, the cleaning blade of the invention whose base material is polyurethane elastomer can be obtained. Also in the case of using silicone rubber as the base material, the cleaning blade of the invention can be obtained by mixing the fluorine resin particulate into the silicone rubber before curing, injecting the uniformly dispersed mixture into the die, and curing by the predetermined method described above. Further, it is also possible to obtain the cleaning blade 16a of the invention by: molding a mixture, which is obtained by dispersing the fluorine resin particulate into the synthetic resin of the base material before curing, into a sheet by an injection molding machine, an extrusion molding machine or the like; heating and curing this sheet; and applying a cutting process or the like to the obtained sheet.

In the invention, by using 15 parts by weight through 33 parts by weight, preferably 18 part by weight through 30 parts by weight of the fluorine resin particulate with respect to 100 parts by weight of the synthetic resin of the base material, it is possible to obtain the cleaning blade of the invention in which the number of the secondary particles of the fluorine resin particulate having a particle diameter of 0.5 μm or more is 50 or less per unit area (100 μm$^2$). In specific, when the fluorine resin particulate having a volume average particle diameter of 50 nm through 200 nm is used, hyper-aggregation of the fluorine resin particulate is prevented, and the generation amount of rough and large secondary particles of the fluorine resin particulate remarkably decreases. As a result, it is possible to obtain the cleaning blade of the invention in which the number of the secondary particles of the fluorine resin particulate having a particle diameter of 0.5 μm or more per unit area (100 μm$^2$) is smaller.

The fixing section 17 includes a fixing roller 22 and a pressurizing roller 23. The fixing roller 22 is a roller-like member that is supported by a supporting section (not shown) so as to freely rotate and disposed so as to be capable of rotating about an axis thereof by a driving mechanism (not shown). The fixing roller 22 has a heating section (not shown) inside, thereby heating toner constituting an unfixed toner image borne on the recording medium 3 conveyed from the transfer nip portion, and fusing the toner to fix onto the recording medium 3. As the fixing roller 22, for example, a roller-like member including a core bar and an elastic layer is used. The core bar is formed by metal such as iron, stainless steel and aluminum. The elastic layer is formed by an elastic material such as silicone rubber and fluorine rubber. In the present embodiment, as the fixing roller 22, a roller-like member having a diameter of 40 mm with a silicone rubber layer formed on the surface of a core bar made of aluminum is used. The heating section generates heat by application of voltage from a power source (not shown). As the heating section, a halogen lamp, an infrared lamp or the like can be used.

The pressurizing roller 23 is a roller-like member that is supported so as to freely rotate and disposed so as to be pressurized by a pressurizing section (not shown) to come in contact with the fixing roller 22. The pressurizing roller 23 is driven to rotate in accordance with rotation of the fixing roller 22. A pressure-contact portion between the fixing roller 22 and the pressurizing roller 23 is a fixing nip portion. At the time of heating and fixing of a toner image to a recording medium, the pressurizing roller 23 presses molten toner to the recording medium 3, thereby accelerating fixation of the toner image to the recording medium 3. Also in the pressurizing roller 23, a heating section may be disposed. As the heating section, it is possible to use the same one as the heating section in the fixing roller 22. As the pressurizing roller 23, it is possible to use a roller-like member having the same configuration as the fixing roller 22. In the present embodiment, as the pressurizing roller 23, a roller-like member having a diameter of 40 mm with a silicone rubber layer formed on the surface of a core bar made of iron is used.

The fixing section 17 fixes the toner image to the recording medium 3 to print an image, by passing the recording medium 3 with the toner image transferred thereon through the fixing nip portion, and fusing toner constituting the toner image as well as pressing to the recording medium 3. The recording mediums 3 with the images printed thereon are discharged by a conveying section (not shown in the drawing) to a paper-discharge tray disposed to the vertical top face or vertical side face of the image forming apparatus 1, and stacked.

The control unit is disposed in, for example, an upper portion of an internal space of the image forming apparatus 1. The control unit includes a storage portion, an calculation portion, and a control portion. Into the storage portion, various kinds of information for controlling the operation of the image forming apparatus 1 are written. The information includes: various set values that are set via a display section (not shown in the drawing) placed on the top face of the image forming apparatus 1; set values for controlling the operations of the respective members of the image forming apparatus 1; detection results from sensors or the like (not shown) placed in some places inside the image forming apparatus 1; image information included in a printing instruction from external equipment; and programs for controlling the operations of the respective members. As the storage portion, it is possible to use one that is generally used in this field, which is a read only memory (ROM), a random access memory (RAM), a hard disk drive (HDD), or the like. The calculation portion takes out various data (a command for image formation, detection result, image information, and the like) inputted into the storage portion and the programs for the respective sections, and performs various determinations. The control portion sends a control signal to the relevant device in accordance with the result of the determination by the calculation portion, and performs operation control. Each of the control portion and the calculation portion is, for example, a processing circuit implemented by a microcomputer provided with a central processing unit (CPU), a microprocessor, or the like. The control unit includes a main power source, as well as the storage portion, the calculation portion and the control portion

EXAMPLES

The invention will be specifically described by using Examples and comparative examples described below. Hereinafter, "part" and "%" represent "part by weight" and "% by weight," respectively.

Example 1

1000 parts of a pre-dispersion solution was prepared as follows: 315 parts of the fluorine resin particulate (product name: dyneon TF9207, polytetrafluoroethylene particulate with a volume average particle diameter of 120 nm, produced by Sumitomo 3M, Ltd.) and 685 parts of toluene were mixed by using a sand grinder. Then, 1000 parts of a fluorine resin particulate dispersion solution was prepared by diluting 330 parts of this dispersion solution with 670 parts of toluene.

The cleaning blade of the invention was produced as follows: 100 parts of ethylene adipate pre-polymer rubber (Mn: 2000, NCO content: 6.5% by weight), 5 parts of 1,4-butanediol, and 200 parts of the fluorine resin particulate dispersion solution were mixed well to obtain a mixture in which the fluorine resin particulate was uniformly dispersed; this mixture was injected into a die for a cleaning blade, and heated and hardened at 140° C. for 150 hours; and thereafter, the product was taken out of the die.

Examples 2 Through 14 and Comparative Examples 1 Through 4

Cleaning blades of Examples 2 through 14 and comparative examples 1 through 4 were produced in a similar manner as in Example 1, except that the use amount of the fluorine resin particulate dispersion solution was regulated so that the content of the fluorine resin particulate became as shown in Table 1. For the cleaning blades obtained in Examples 1 through 14 and the comparative examples 1 through 4, evaluation was performed in accordance with the following method. The results are also shown in Table 1.

[Number of particles with a particle diameter of 0.5 μm or more per 100 μm$^2$]

The cleaning blades of Examples 1 through 14 and the comparative examples 1 through 4 were cut along the short-side direction, and the cross sections thereof were observed at 30000 magnifications by using a scanning electron microscope (product name: JSM-6300, produced by JEOL Ltd.). For each of the cleaning blades, 100 field-of-views were observed to measure the number of the secondary particles having a particle diameter of 0.5 μm or more, and the average value was determined from the obtained measurement result. Further, the average value was converted into the number per 100 μm$^2$.

[Number of sheets at the time of occurrence of a cleaning failure (mm/s)]

The cleaning blades of Examples 1 through 14 and the comparative examples 1 through 4 were each mounted on a commercial image forming apparatus (product name: MX5500N, produced by Sharp Kabushiki Kaisha) employing a scorotron-type non-contact charging system. The contact pressure (blade linear pressure) of the cleaning blade to the surface of the photoreceptor drum was made to be 19.6× $10^{-3}$ N/cm (20 g/cm). By performing continuous printing of a monotone sample image of A4 size by using this image forming apparatus, the number of sheets at the time of occurrence of cleaning failure was examined. Herein, the cleaning failure was examined by printing a solid image of 10 mm width per 5K (5000 sheets) and checking trailing (flow of an image) of a rear end portion of the solid with eyes. The used toner was melted, kneaded and grinded toner in which the content of the release agent was 5%, 10% or 12% (the content of pigment was 6%, binding resin was polyester, volume average particle diameter was 6.5 μm). Moreover, in a case where the number of sheets at the time of occurrence of cleaning failure was 100K (one hundred thousand sheets) or more, it was determined that the cleaning performance was good.

TABLE 1

|   |   | Content of release agent % | Content of fluorine resin particulate Part | Number of particles having particle diameter of 0.5 μm or more/ 100 μm$^2$ | Number of sheets at time of occurrence of cleaning failure mm/s | Recital |
|---|---|---|---|---|---|---|
| Ex. | 1 | 10 | 15 | 49 | 120K | |
|  | 2 | 10 | 20 | 30 | 160K | |
|  | 3 | 10 | 30 | 23 | 200K | |
|  | 4 | 5 | 15 | 50 | 190K | |
|  | 5 | 5 | 20 | 30 | 230K | |
|  | 6 | 5 | 30 | 23 | 300K | |
|  | 7 | 12 | 15 | 49 | 120K | |
|  | 8 | 12 | 20 | 30 | 170K | |
|  | 9 | 12 | 30 | 23 | 130K | |
|  | 10 | 15 | 15 | 49 | 105K | |
|  | 11 | 15 | 20 | 30 | 110K | |
|  | 12 | 15 | 30 | 23 | 190K | |

TABLE 1-continued

| | | Content of release agent % | Content of fluorine resin particulate Part | Number of particles having particle diameter of 0.5 μm or more/ 100 μm² | Number of sheets at time of occurrence of cleaning failure mm/s | Recital |
|---|---|---|---|---|---|---|
| Comp. Ex. | 1 | 10 | — | — | 5K | Occurrence of image blur |
| | 2 | 10 | 10 | 60 | 20K | Occurrence of image blur |
| | 3 | 10 | 35 | 10 | — | Molding failure |
| | 4 | 12 | 35 | 10 | 205K | Molding failure |

From Table 1, it is clarified what is described below. Comparison between Examples 1 through 12 and the comparative example 1 shows that the cleaning capability is remarkably enhanced as a result of addition of the fluorine resin particulate. Comparison between Examples 1 through 12 and the comparative example 2 shows that when the number of particles (secondary particles) having a particle diameter of 0.5 μm or more exceeds 50 per 100 μm², the cleaning capability extremely deteriorates even if the fluorine resin particulate is added. Besides, comparison between Examples 1 through 12 and the comparative examples 3 through 4 shows that when the content of the fluorine resin particulate exceeds 30 parts with respect to 100 parts of the synthetic resin of the base material (herein, ethylene adipate pre-polymer rubber), molding failure occurs, or the amount of film thickness decrease of the surface of the photoreceptor drum becomes outstandingly large.

Examples 13 Through 18

By mounting the cleaning blade of Example 2 on the image forming apparatus (product name: MX5500N), changing the contact pressure (blade linear pressure) of the cleaning blade to the surface of the photoreceptor drum as shown in FIG. 2, and performing continuous printing of a monotone sample image of A4 size in a similar manner as in Example 1, the number of sheets at the time of occurrence of cleaning failure was examined. The result is shown in Table 2.

TABLE 2

| Ex. | Content of release agent % | Blade linear pressure N/cm | Number of sheets at time of occurrence of cleaning failure mm/s | Recital |
|---|---|---|---|---|
| 13 | 10 | $4.9 \times 10^{-3}$ | 70K | Occurrence of image blur |
| 14 | 10 | $9.8 \times 10^{-3}$ | 120K | |
| 15 | 10 | $14.7 \times 10^{-3}$ | 1140K | |
| 16 | 10 | $19.6 \times 10^{-3}$ | 160K | |
| 17 | 10 | $29.4 \times 10^{-3}$ | 230K | |
| 18 | 10 | $34.3 \times 10^{-3}$ | 260K | Occurrence of damage of photoreceptor Large film thickness decrease |

From Table 2, it is apparent that when the blade linear pressure is in the range of from $9.8 \times 10^{-3}$ N/cm to $29.4 \times 10^{-3}$ N/cm, an image failure such as an image blur, damage of the photoreceptor, outstanding film thickness decrease of the photosensitive film, and so on do not occur, and the cleaning capability outstandingly is enhanced.

Examples 19 Through 28

In a similar manner as in Example 1, except for use of the fluorine resin particulate having different volume average particle diameters as shown below, the cleaning blades of Examples 19 through 28 were produced. By mounting each of these cleaning blades on the image forming apparatus (product name: MX5500N), and performing continuous printing of a monotone sample image of A4 size in a similar manner as in Example 1, the number of sheets at the time of occurrence of cleaning failure was examined. The result is shown in Table 3.

[Fluorine Resin Particulate]
Volume Average Particle Diameter 30 nm:
  PTFE particulate produced by Sumitomo 3M, Ltd.
Volume Average Particle Diameter 50 nm:
  PTFE particulate produced by Sumitomo 3M, Ltd.
Volume Average Particle Diameter 120 nm:
  Dyneon TF9207 (product name), PTFE particulate produced by Sumitomo 3M, Ltd.
Volume Average Particle Diameter 200 nm:
  Dyneon TF9201 (product name), PTFE particulate produced by Sumitomo 3M, Ltd.
Volume Average Particle Diameter 250 nm:
  XAD911 (product name), PTFE particulate produced by Asahi Glass Co., Ltd.

TABLE 3

| | Concentration of release agent in toner: 10% by weight, Blade linear pressure: 20 g/cm | | | | |
|---|---|---|---|---|---|
| | Fluorine resin particulate | | Number of particles | Number of sheets at time of | |
| Ex. | Content Part | Volume average particle diameter nm | having particle diameter of 0.5 μm or more/ 100 μm² | occurrence of cleaning failure mm/s | Recital |
| 19 | 15 | 30 | 57 | 100K | Occurrence of image blur |
| 20 | 15 | 50 | 50 | 110K | |

TABLE 3-continued

Concentration of release agent in toner: 10% by weight, Blade linear pressure: 20 g/cm

| Ex. | Fluorine resin particulate Content Part | Fluorine resin particulate Volume average particle diameter nm | Number of particles having particle diameter of 0.5 μm or more/ 100 μm² | Number of sheets at time of occurrence of cleaning failure mm/s | Recital |
|---|---|---|---|---|---|
| 21 | 15 | 120 | 49 | 120K | |
| 22 | 15 | 200 | 18 | 150K | |
| 23 | 15 | 250 | 10 | 160K | Occurrence of damage of photoreceptor |
| 24 | 30 | 30 | 50 | 200K | |
| 25 | 30 | 50 | 41 | 240K | |
| 26 | 30 | 120 | 23 | 200K | |
| 27 | 30 | 200 | 30 | 230K | |
| 28 | 30 | 250 | 19 | 300K | Occurrence of damage of photoreceptor |

From Table 3, it is apparent that by using the fluorine resin particulate having a volume average particle diameter of 50 nm through 200 nm, the cleaning capability is outstandingly enhanced without occurrence of an image failure such as an image blur, damage of the photoreceptor, and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A cleaning blade comprising a synthetic resin as a base material; fluorine resin particulate; and secondary particles thereof, the fluorine resin particulate and the secondary particles thereof being dispersed in the synthetic resin,
wherein a combined content of the fluorine resin particulate and the secondary particles thereof is in a range of 15 parts by weight to 33 parts by weight with respect to 100 parts by weight of the synthetic resin; and the secondary particles of the fluorine resin particulate having a particle diameter of 0.5 μm or more are dispersed at a ratio of 50 particles or less per 100 μm² in a short side cross-section of the cleaning blade.

2. The cleaning blade of claim 1, wherein the combined content of the fluorine resin particulate and the secondary particles thereof is in a range of 18 parts by weight to 30 parts by weight with respect to 100 parts by weight of the synthetic resin of the base material.

3. The cleaning blade of claim 1, wherein a volume average particle diameter of the fluorine resin particulate is in a range of 50 nm to 200 nm.

4. The cleaning blade of claim 1, wherein the fluorine resin particulate is polytetrafluoroethylene particulate.

5. The cleaning blade of claim 1, wherein the synthetic resin of the base material is a synthetic resin having elasticity.

6. The cleaning blade of claim 1, wherein the synthetic resin of the base material is polyester elastomer, polyurethane elastomer, fluorine rubber, or silicone rubber.

7. An electrophotographic image forming apparatus comprising:
a photoreceptor drum;
a charging section for charging a surface of the photoreceptor drum;
an exposure section for exposing the surface of the photoreceptor drum with a signal light and forming an electrostatic latent image on the surface of the photoreceptor drum;
a developing section for supplying toner to the electrostatic latent image formed on the surface of the photoreceptor drum and forming a toner image;
a transfer section for transferring the toner image formed on the surface of the photoreceptor drum to a recording medium;
a fixing section for fixing the toner image onto the recording medium; and
a cleaning section provided with the cleaning blade of claim 1 disposed so as to abut on the surface of the photoreceptor drum.

8. The image forming apparatus of claim 7, wherein a content of a release agent of the toner is 5% or more of a whole weight.

9. The image forming apparatus of claim 7, wherein the charging section charges the surface of the photoreceptor drum in a state of contacting with the photoreceptor drum.

10. The image forming apparatus of claim 7, wherein the cleaning blade abuts on the surface of the photoreceptor drum at linear pressure of $9.8 \times 10^{-3}$ N/cm through $29.4 \times 10^{-3}$ N/cm.

* * * * *